United States Patent
Klausmeier et al.

(10) Patent No.: US 6,343,075 B1
(45) Date of Patent: Jan. 29, 2002

(54) REARRANGEABLE SWITCH HAVING A NON-POWER OF TWO NUMBER OF PHYSICAL CENTER STAGES

(75) Inventors: Daniel E. Klausmeier, Menlo Park; Jeffrey T. Gullicksen, Santa Clara, both of CA (US)

(73) Assignee: CIENA Corporation, Linthicum, MD (US)

(*) Notice: Subject to any disclaimer, the term of this patent is extended or adjusted under 35 U.S.C. 154(b) by 0 days.

(21) Appl. No.: 09/427,299

(22) Filed: Oct. 26, 1999

(51) Int. Cl.$^7$ .................... H04L 12/50; H04Q 11/00
(52) U.S. Cl. ................. 370/388; 359/135; 340/2.21
(58) Field of Search ................. 370/376, 375, 370/388, 535, 360, 369, 370, 372, 377, 380, 386–387; 340/2.22, 2.21, 2.6; 379/271; 359/117, 128, 138, 139, 135

(56) References Cited

U.S. PATENT DOCUMENTS

| | | | |
|---|---|---|---|
| 5,390,178 A | 2/1995 | Hunter | 370/388 |
| 5,495,476 A * | 2/1996 | Kumar | 370/388 |
| 5,825,517 A | 10/1998 | Antoniades et al. | 359/117 |
| 5,864,552 A * | 1/1999 | Du et al. | 370/386 |

OTHER PUBLICATIONS

Steinar Andresen, "The Looping Algorithm Extended to Base 2 Rearrangeable Switching Networks", IEEE Transactions on Communications, vol. Com–26, No. 10, Oct., 1977.

J. Y. Hui, "Switching and Traffic Theory For Integrated Broadband Networks", Kluwer Academic Publishers, 1990, pp. 77–80.

* cited by examiner

Primary Examiner—Seema S. Rao
(74) Attorney, Agent, or Firm—David L. Soltz; Michael R. Cammarata; Douglas Luftman (57) ABSTRACT

A switch is provided that includes three stages. The first stages has a plurality of switch circuits. The second stage has a plurality of switch circuits equal to N, where N is any integer other than a power of 2 and where the switch circuits can be logically configured into a logical configuration of a power of 2. The third stages includes a plurality of switch circuits.

11 Claims, 10 Drawing Sheets

REARRANGEABLE SWITCH HAVING A NON-POWER OF TWO NUMBER OF PHYSICAL CENTER STAGES

BACKGROUND OF THE INVENTION

Telecommunication switches are provided in a network in order to direct data from one line to another. Typically, switches have a plurality of inputs and a corresponding plurality of outputs. Network lines can be coupled to each of the switch inputs and outputs, so that data carried on any input line can be routed to any output line. Networks do not remain fixed, however. Frequently, some lines are added, while others are dropped. Alternatively, data previously intended for one switch output line may be required to be shifted to another output line. In response to such changes, switches in a network must be appropriately reconfigured or rearranged. Moreover, the switches should be non-blocking, i.e., any input can be mapped or coupled to any output without any collisions or conflicts.

Non-blocking rearrangement algorithms are known which provide adequate rearrangement of a switch. Once such algorithm, known as the Looping Algorithm, requires that a switch be divided into stages of smaller 2×2 switches. See J. Y. Hui, "Switching and Traffic Theory For Integrated Broadband Networks", Kluwer Academic Publishers, 1990, pp. 77–80. Routes through the switch originate at an input, and following a known methodology, pass through selected 2×2 switches to a desired output. The route then loops back through an adjacent output to couple to a desired input. This process is repeated until each input is coupled to a desired output.

Although the Looping Algorithm is relatively fast, conventional switches, reconfigurable based on the looping algorithm, require a power of 2, i.e., $2^n$, physical center stages, where n is an integer. Each switch, however, occupies space and consumes power. Accordingly, in circumstances when a switch must conform to various spatial, as well as, power constraints, reconfiguration based on the Looping Algorithm may not be possible.

SUMMARY OF THE INVENTION

Consistent with the present invention, a switch is provided comprising a first stage having a plurality of first switch circuits, each of which including a plurality of inputs and a plurality of outputs. A second stage is also included having a plurality of second switch circuits. Each of the plurality of second switch circuits has a plurality of inputs, each of which being respectively coupled to one of the plurality of outputs of the plurality of first switch circuits. Each of the plurality of second switch circuits also has a plurality of outputs, whereby a number of the plurality of second switch circuits equals N, where N is any integer other than a power of 2. The switch further includes a third stage having a plurality of third switch circuits, each of which including a plurality of inputs and a plurality of outputs. Each of the plurality of inputs of the third switch circuits is coupled to a respective one of the plurality of outputs of the second switch circuits.

Both the foregoing general description and the following detailed description explain examples of the invention and do not, by themselves, restrict the scope of the appended claims. The accompanying drawings, which constitute a part of this specification, illustrate apparatus and methods consistent with the invention and, together with the description, help explain the principles of the invention.

BRIEF DESCRIPTION OF THE DRAWINGS

The accompanying drawings, which are incorporated in and constitute a part of this specification, illustrate embodiments of the invention and, together with the description, serve to explain the advantages of the invention. In the drawings.

DETAILED DESCRIPTION OF THE INVENTION

The following detailed description refers to the accompanying drawings. The same reference numbers in different drawings identify the same or similar elements. Also, the following detailed description does not limit the invention. Instead, the scope of the invention is defined by the appended claims.

Figure 1:
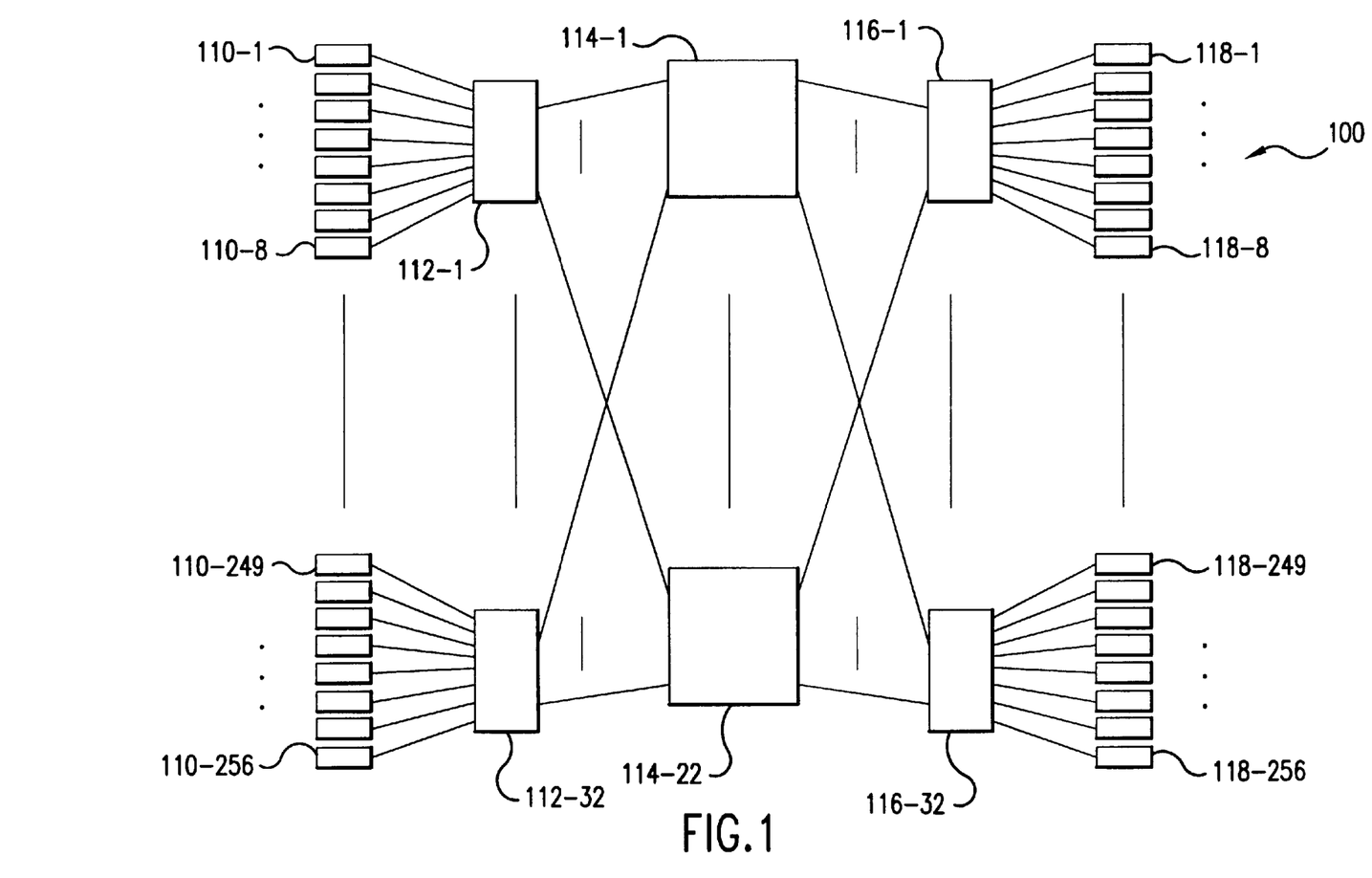
FIG. 1 illustrates a functional block diagram of a switch in accordance with the present invention.

FIG. 1 illustrates a switch 100 consistent with an embodiment of the present invention. Switch 100 includes a plurality of inputs 110-1 to 110-256, which receive signals conforming to a given protocol from an external network; group the signals in frames suitable for processing in switch 100; and forward the signals to a first stage of switch circuits 112-1 to 112-32. The data signals are routed through these switch circuits and passed to a second stage of switch circuits 114-1 to 114-22, which further route the data signals. A third stage of switch circuits 116-1 to 116-32 direct the data to desired outputs 118-1 to 118-256, which supply the data signals to an external network, but typically in the protocol in which the signals were input to switch 100.

Figure 2:
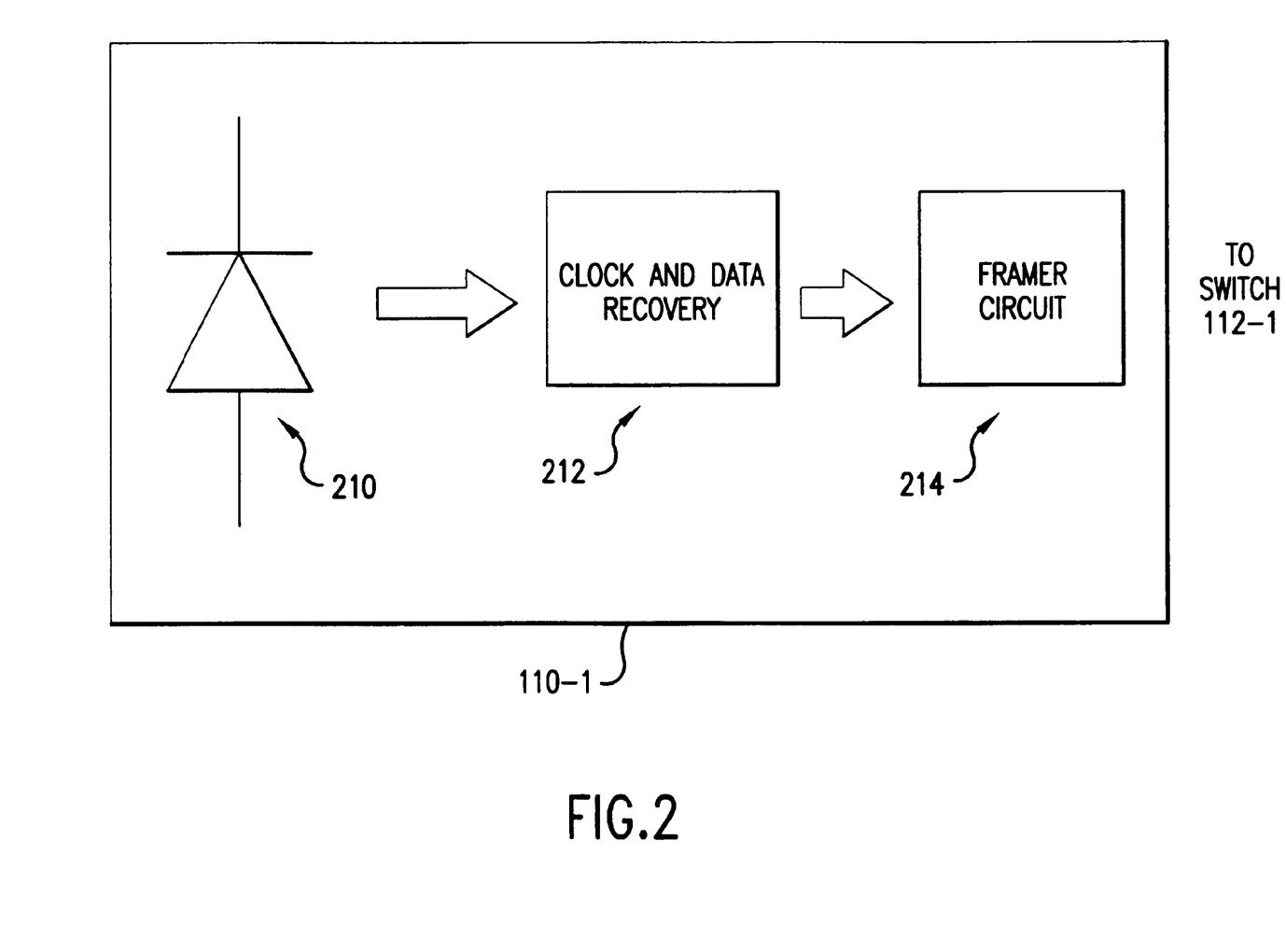
FIG. 2 illustrates an input block of the switch shown in FIG. 1.

FIG. 2 illustrates input 110-1 in greater detail. Remaining inputs 110-2 to 110-256 typically have a similar construction as input 110-1. Data is generally supplied to input 110-1 as optical signals conforming to a Synchronous Optical Network (SONET) protocol at a rate of approximately 2.5 Gbit/sec. A receiver circuit, including for example, photodetector 210 converts the received optical signals into corresponding electrical signals. A conventional clock and data recovery circuit 212 appropriately shapes the electrical signals and extracts a clock signal for timing purposes. A framer circuit is coupled to the output of the clock and data recovery circuit, for grouping the received data into frames suitable for processing within switch 100.

Figure 3:
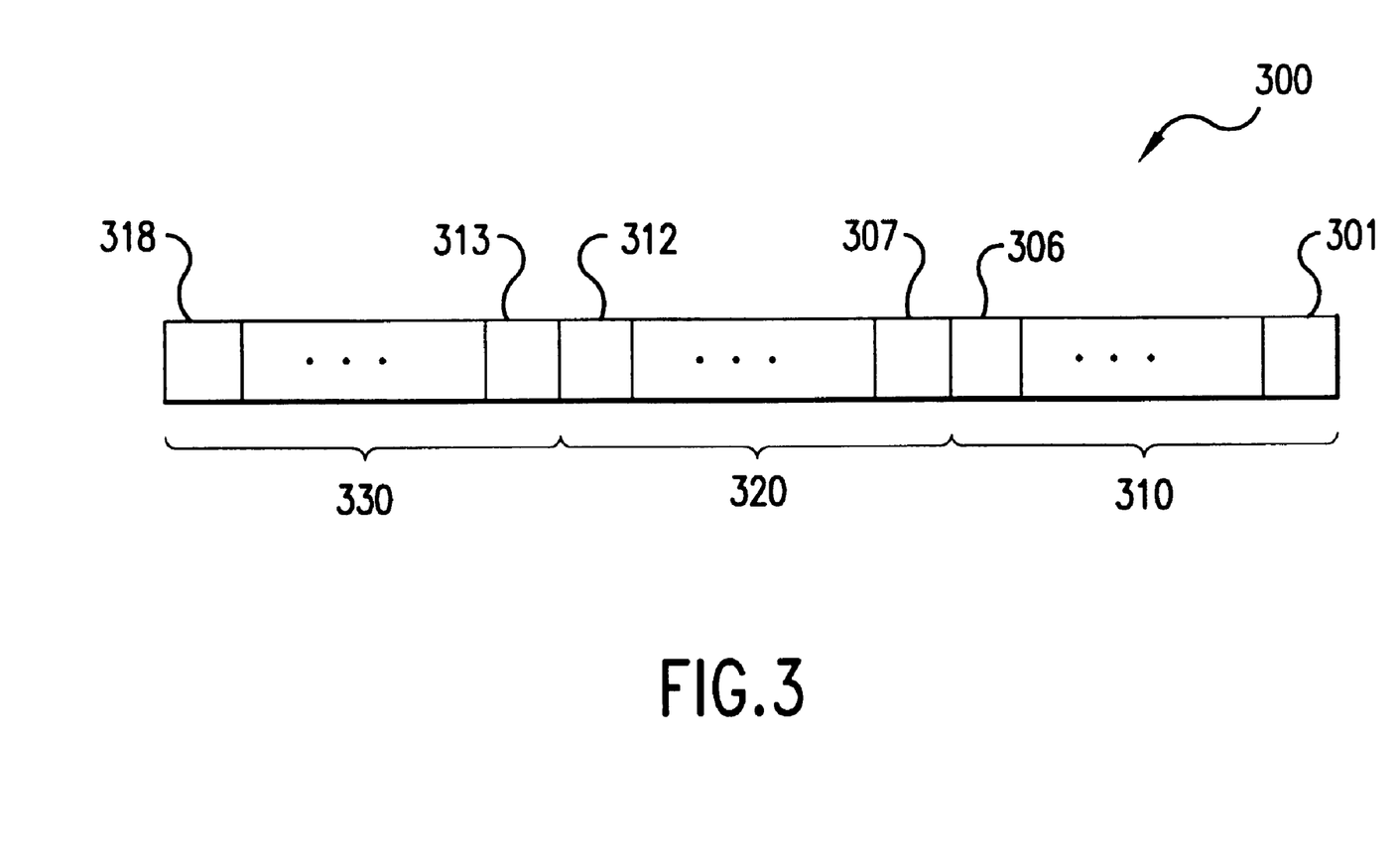
FIG. 3 illustrates a format of a frame of data processed by the switch shown in FIG. 1.

As shown in FIG. 3, an exemplary frame 300 output from framer circuit 214 includes 18 time slots 301 to 318. The time slots are further grouped into time division multiplexed sub-frames 310, 320 and 330, having six time slots each. Each time slot is equivalent to an Synchronous Transport (STS) level 1 or STS-1 frame and, transmits data at a rate of 54.84 Mbit/second.

The construction of switch circuit 112-1 will next be described with reference to FIGS. 4(a), 4(b), 4(c), 5 and 6.

Switch circuits 112-2 to 112-32 typically have a similar construction as switch circuit 112-1.

By way of introduction, switches can be classified into one of two categories, space division and time division. Space division switches can be implemented as crossbar switches having m input and n outputs and mn crosspoints (m and n are integers). By making an electrical contact via a crosspoint between a horizontal input bus and a vertical output bus, a connection can be made between the associated input and output, respectively.

Instead of using a space division switch, however, time division switching techniques can also be applied for interconnecting inputs and outputs. A so-called time slot interchanger (TSI) can be used for such purposes. A TSI includes a buffer which reads from a single input and writes to a single output. The input is framed into m fixed-length time slots. The information in each input time slot is read sequentially into consecutive time slots (cyclically) of a buffer of m slots. The output is framed into n time slots, and information from the appropriate slot in the buffer is transmitted onto a corresponding output slot. Thus, over the duration of an output frame, the content of the buffer is read in predetermined manner according to a read-out sequence so that the information in each slot of the input frame is rearranged into the appropriate slot in the output frame. As a result, each time slot is interchanged.

Time division switching can be performed by a TSI. Since each time slot of a multiplexed link is analogous to a circuit, the interchanging of information in time slots is comparable to switching of circuits in a space switch. Thus, a TSI can also be used to interconnect multiple input and outputs (each providing a single circuit), provided that the inputs are first multiplexed onto a single time division multiplexed (TDM) stream, and the time slot interchanged TDM stream from the TSI is then demultiplexed onto the outputs. The space-switched connections via a crossbar can therefore also be realized by a corresponding read-in sequence for time switched connections via a TSI. Switching can thus be achieved with either space division switches or time domain switches with the same result.

The present invention utilizes a combination of time division and space switching to logically create $2^n$ center stage switching circuits in a switch reconfigurable based on the Looping Algorithm. The Looping Algorithm will next be described with reference to FIGS. 4(a) to 4(c).

Figure 4A:
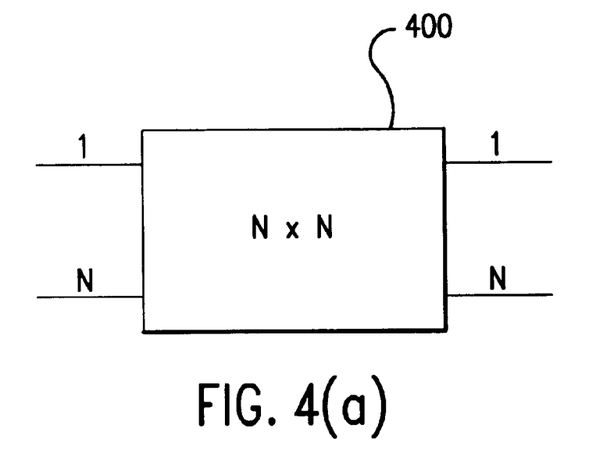
FIGS. 4(a)–(c) illustrate factoring steps and connections required by an exemplary application of the Looping Algorithm.
Figure 4B:
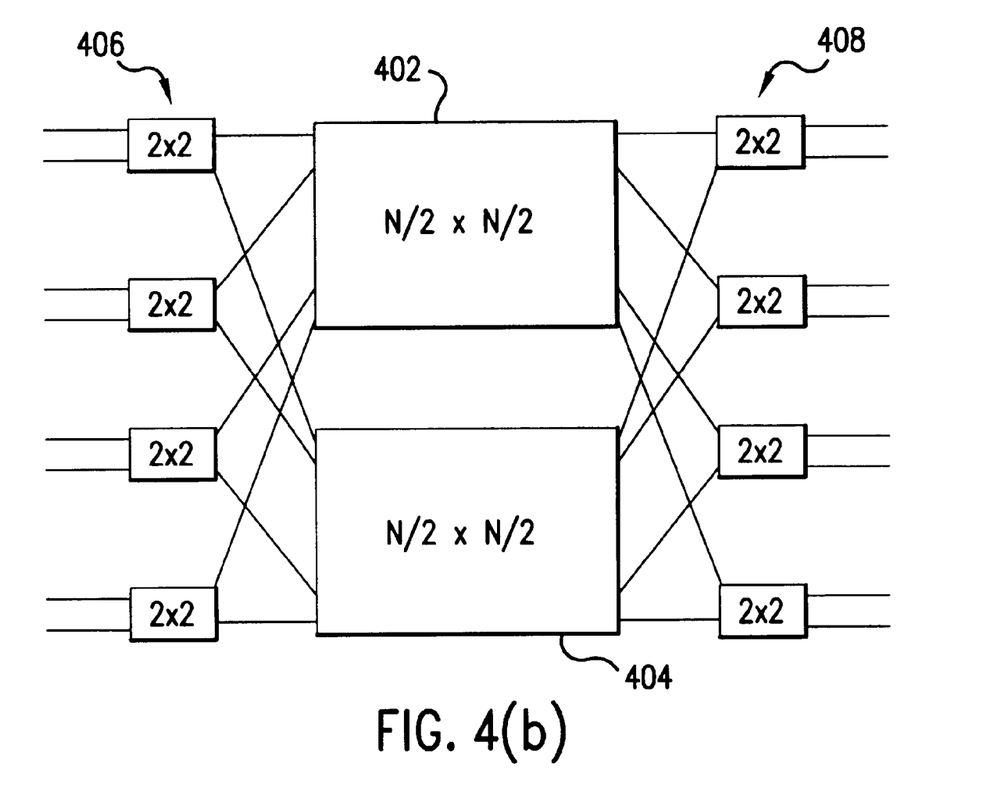

As seen in FIG. 4(a), the Looping Algorithm requires a switch having N inputs and N outputs, where $N=2^n$, n being an integer. In FIG. 4(b), switch 400 is rearranged or factored logically into N/2 sub-arrays 402 and 404, as well as 2×2 switch stages 406 and 408. Further, in accordance with the Looping Algorithm, each 2×2 switch has one output coupled to upper sub-array 402 and one to lower sub-array 404 in FIG. 4(b). If necessary, sub-arrays 402 and 404 can be further factored to yield additional 2×2 stages as well as center stages including four N/4 sub-arrays.

Figure 4C:
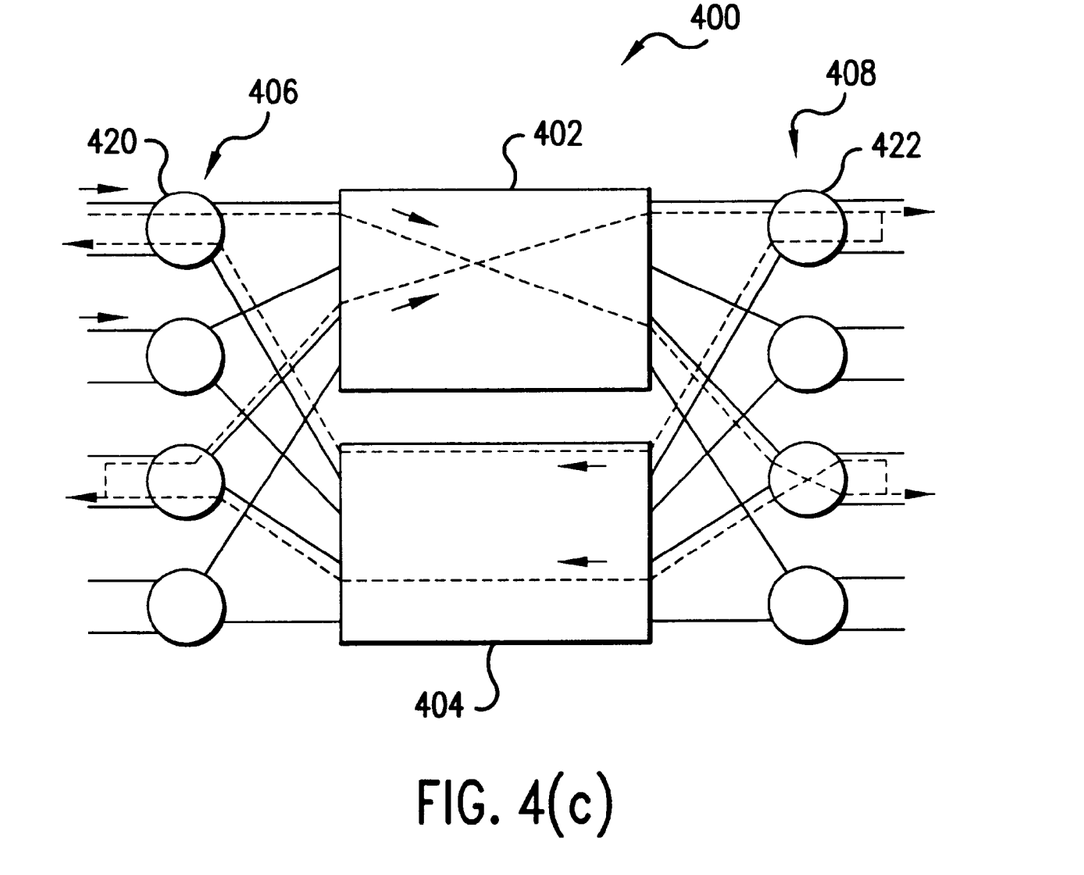

An example of the steps carried out by the Looping Algorithm will next be described with reference to FIG. 4(c). In a first step, an unconnected input of 2×2 switch 420 in stage 406 is coupled, via upper switch 402, to desired output of 2×2 switch 423 in stage 408. The adjacent output of switch 422 423 is then coupled to a desired input, e.g., an input of switch 421, through lower switch 404. The 2×2 switch 421 in stage 406 then is coupled to the adjacent input of switch 421 through the upper switch 402 (loop forward) to an output of switch 422 in stage 408. An adjacent output of switch 422 is coupled to an input of stage 406 switch 420 through lower switch 404 (loop back). This process is repeated until both inputs of switch 420 are connected to corresponding outputs. This completes the loop of the Looping Algorithm. Next, another unconnected input of a 2×2 switch in stage 406 is chosen and the above referenced steps are repeated to complete the loop. When no more unconnected inputs are free, the Algorithm terminates.

Each of stages 112-1 to 112-32 is similarly logically factored into stages of 2×2 switches. However, in an example of the present invention, each of switch circuits 112-1 to 112-32 is configured to receive and output 384 of the above-described time slots. A logical representation of switch circuit 112-1, for example, is shown in FIG. 5.

Switch 112-1 is a conventional cross-bar switch, configured to logically include stages of 2×2 switches 510, 512, 514, 516, 518, and 520 (see FIG. 5) after a series of factorizations as described above. After the factorizations are complete, the stages are rearranged so that the layout of the logical 2×2 switches is consistent with the hardware of the cross-bar switch. In particular, stage 510 is configured to have a bank of switches with 384 inputs receiving time slots on bus 522, and output two groups of time slots on 192 byte-wide buses 524 and 526, respectively. Switch stage 512, includes two banks coupled to buses 524 and 526, and outputting data on 96 byte-wide buses 528 to respective switch banks in stage 514. Each bank of switches in stage 514, in turn, outputs data onto 48 byte-wide buses 530, which are coupled to a respective one of switch blocks in stage 516. Each bank in stage 516 is coupled to a pair of 24 byte-wide buses 532 for supplying data to a corresponding one of switch banks in stage 518. As further shown in FIG. 5, switches in stage 518, receive data from respective ones of buses 532 and route the data onto corresponding pairs of 12 byte-wide buses 536. The data is next passed to switch banks in stage 520, where it is routed onto 6 byte-wide busses, each of which being coupled directly to one of center stage switches 114-1 to 114-22.

Figure 5:
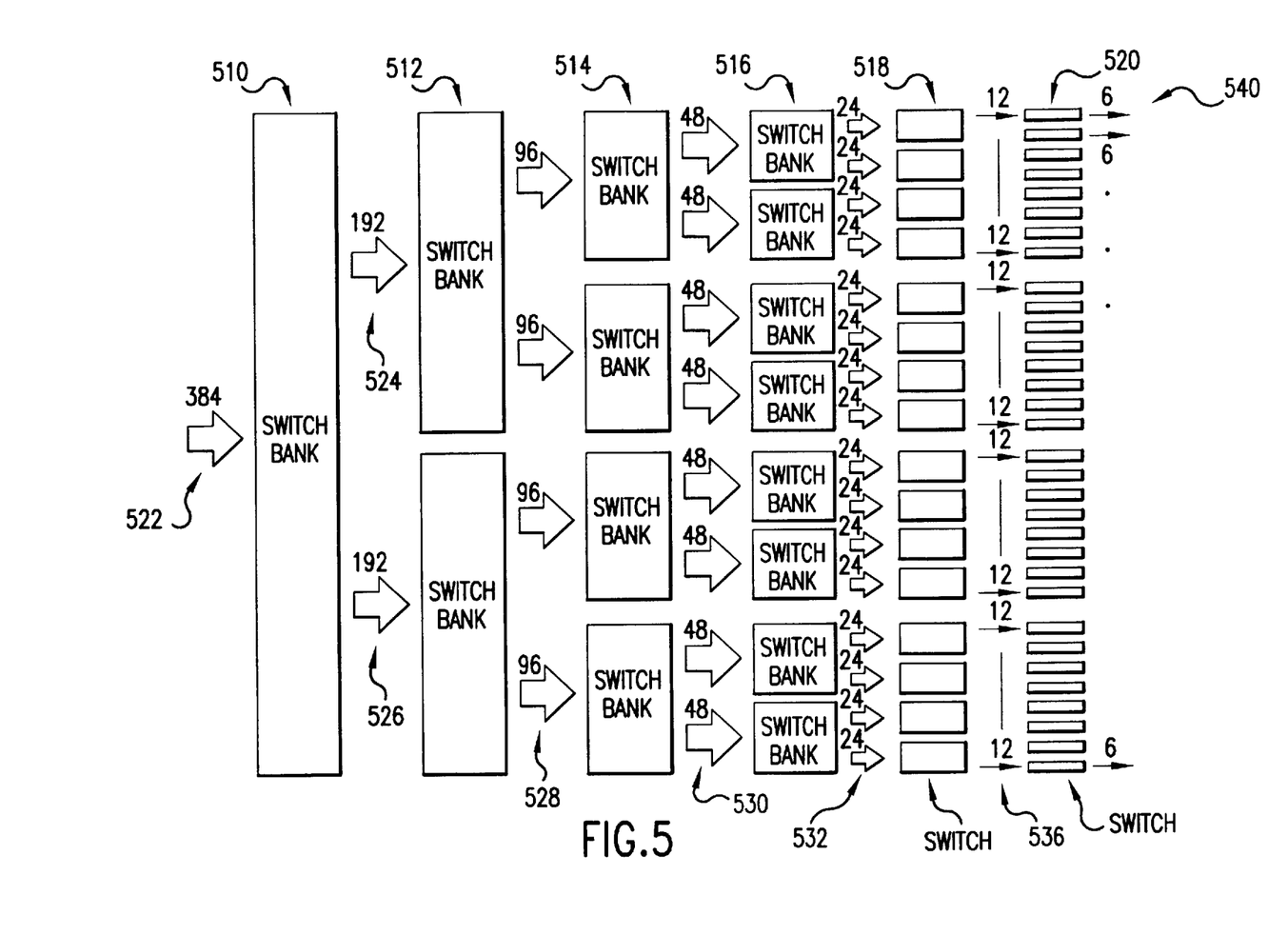
FIG. 5 illustrates a block diagram of logical groupings of 2×2 switches in one of switch circuits 112-1 to 112-32.
Figure 6:
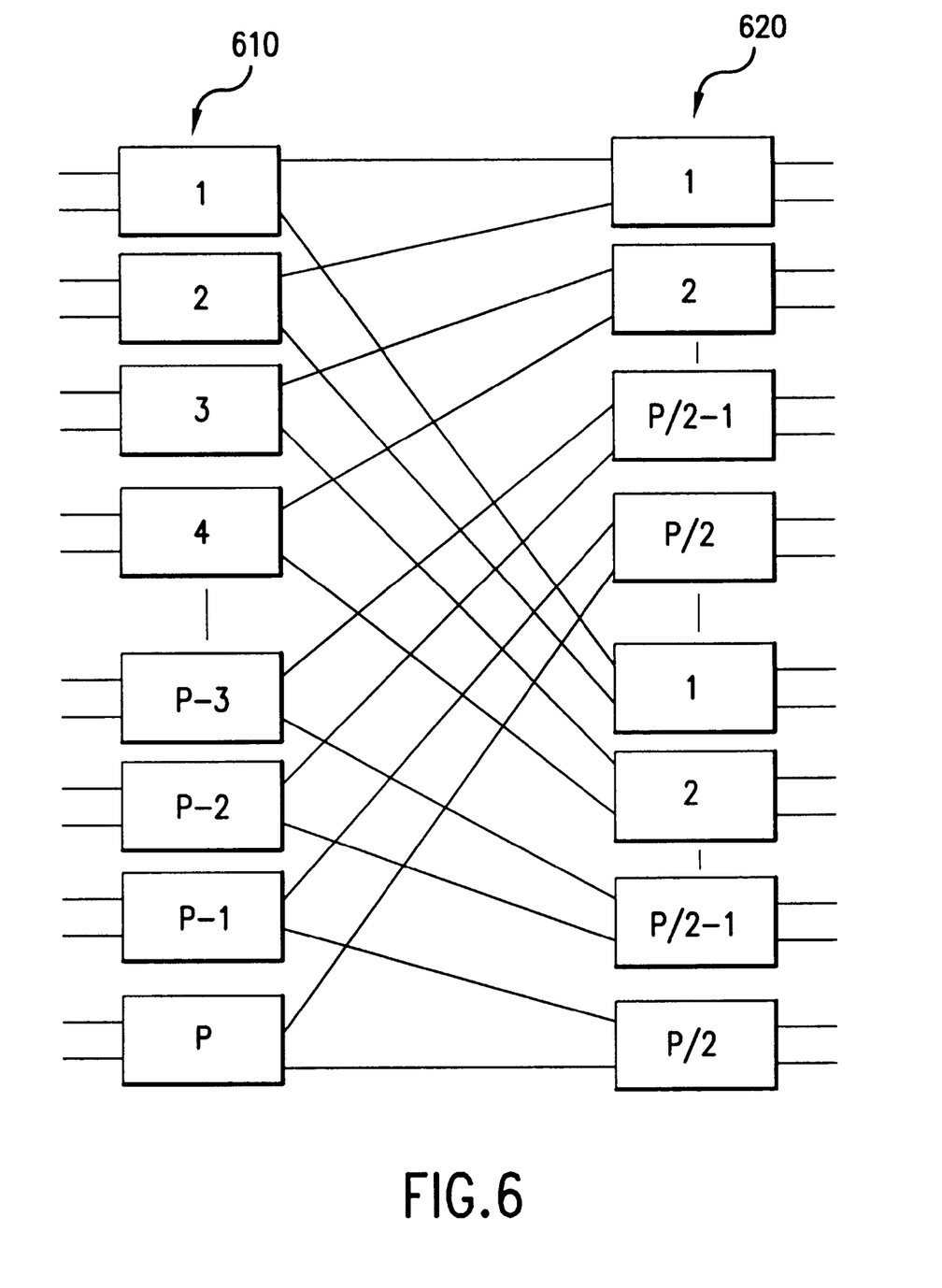
FIG. 6 illustrates in greater detail connections between 2×2 switches in one of switch circuits 112-1 to 112-32.

FIG. 6 illustrates one of the switch banks shown in FIG. 5. Each bank includes two sub-stages 610 and 620 that have P 2×2 switches, where P is the width of the bus coupled to the inputs of each bank, e.g. P=384 for the bank of stage 510, 192 for the banks of stage 512, 96 for the banks of stage 514, 48 for the banks of stage 516, 24 for the banks of stage 518, and 12 for the banks of stage 520. Connections between each of the 2×2 switches are further illustrated in FIG. 6. These connections are consistent with the requisite hardware connections within each of switch circuits 112-1 to 112-32.

Returning to FIG. 5, each of switch banks 520 is logically coupled to a respective six byte wide bus, which carries one sub-frame having six time slots at any given time. In a physical implementation, however, three such buses are time division multiplexed onto a single line to obtain frames 300 discussed above with reference to FIG. 3. As indicated above, these frames further include three sub-frames, each of which including six time slots each. Each six byte wide output bus of switch banks 520 is next fed to a respective one of center stage switch circuits 114-1 to 114-22. Since the sub-frames are effectively time switched, which is equivalent to space switching, additional switches can be logically created in the center stage as discussed in detail below.

Figure 7:
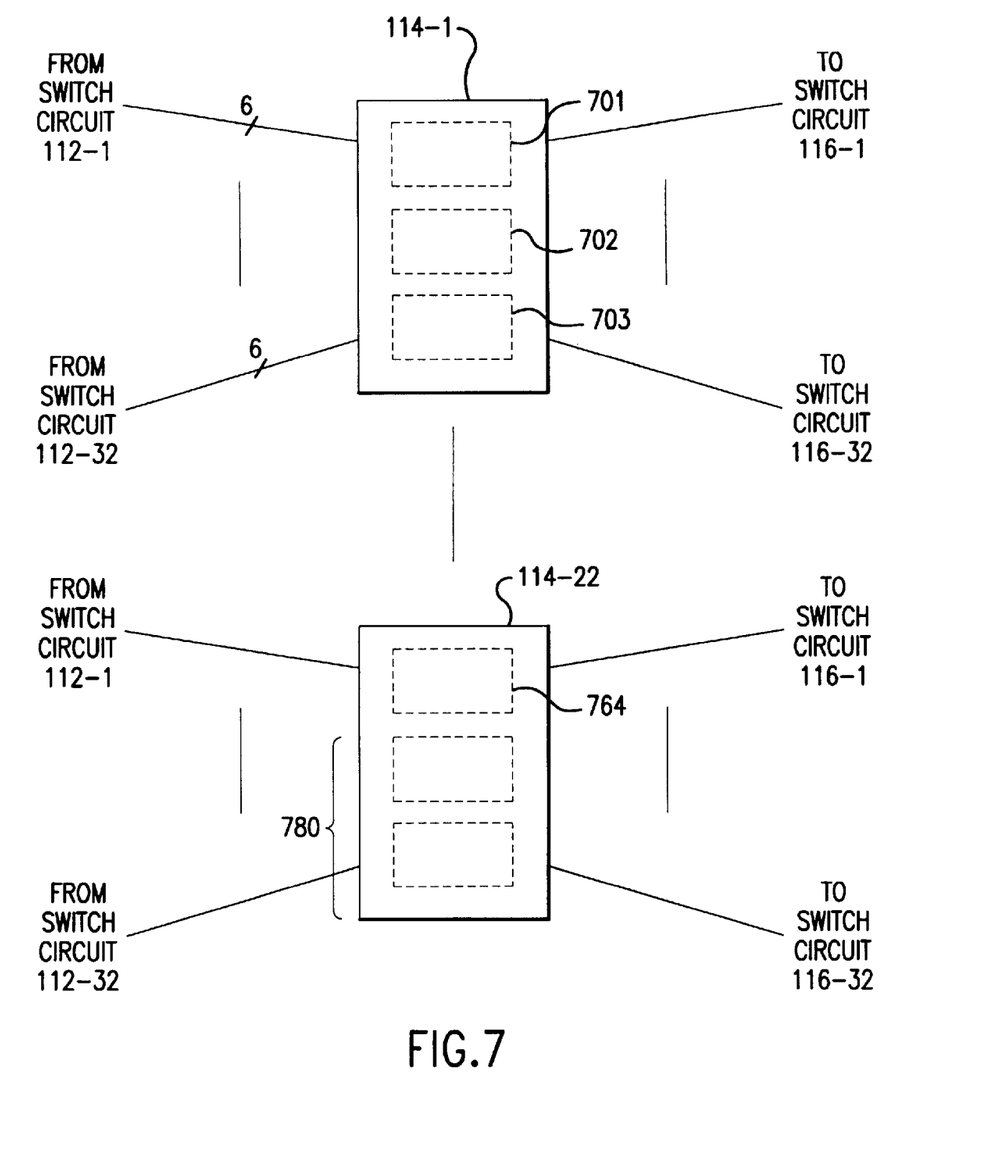
FIG. 7 illustrates connections made to center stage switch circuits shown in FIG. 1.

FIG. 7 illustrates connections to center stage switch circuits 114-1 to 114-22 in greater detail. Switch circuit 114-1, for example, is coupled to a six-byte wide output bus from each of switch circuits 112-1 to 112-32. Since each bus carries three time division multiplexed sub-frames, each of center stage switches 114-1 to 114-22 logically receives an eighteen byte-wide bus from each of switch circuits 112-1 to 112-32 due to the equivalence of time and space switching. The sub-frames can be rearranged within switches 114-1 to 114-22 and regrouped into frames which are then supplied on one of 32 output lines to a respective one of third stage switch circuits 116-1 to 116-32.

In the particular example of the invention discussed herein, there are 384 outputs from each of switch circuits 112-1 to 112-32, and the outputs are grouped into 18 time slots each. Thus, the minimum number of center stage switches is 22 (384/18=22). Since this number is not a power of 2, the Looping Algorithm cannot be applied in a conventional sense. However, consistent with the present invention, each of center stage switch circuits 114-1 to 114-22 is logically subdivided into three sub-switches (shown in phantom in FIG. 7 as blocks 701, 702, 703 to 764), each of which receiving a respective time division multiplexed sub frame of six time slots. In addition, the number of logically subdivided sub-switches can be equal to the number of sub-frames. Since there are 22 physical center stage switches, there are a total of 3×22, i.e., 66, logical center stage sub-switches. In this instance, the Looping Algorithm only requires 64 ($2^6$=64) center stages. Accordingly, the Looping algorithm can be implemented even though there is not a power of 2 physical center stage switches. In addition, two of the logical stages can be used as spares 780.

Figure 8:
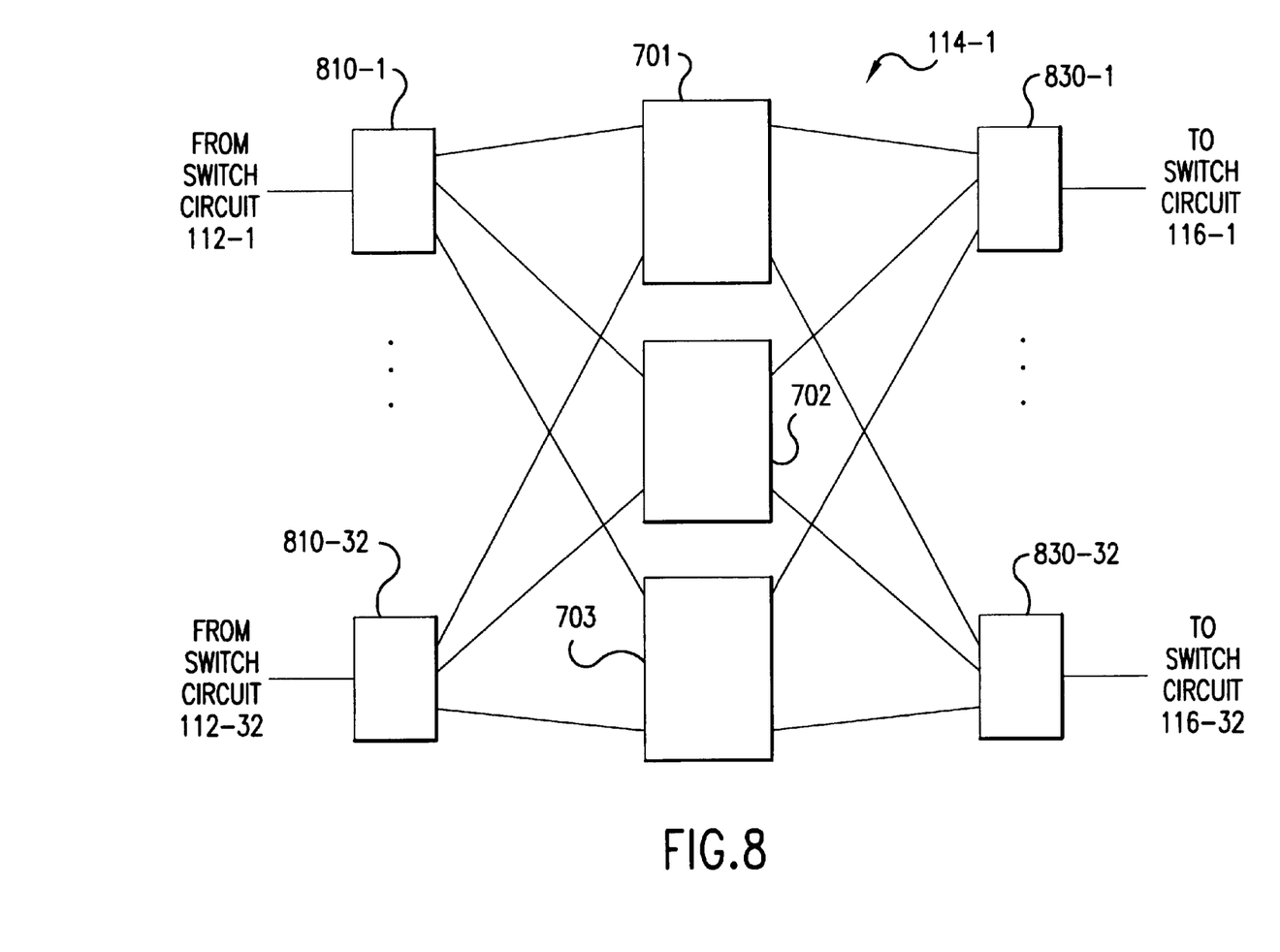
FIG. 8 illustrates in greater detail one of the center stage switch circuits shown in FIG. 1.

FIG. 8 illustrates center stage switch circuit 114-1 in greater detail. Switch circuit 114-1 may have a similar construction as remaining switch circuits 114-2 to 114-22. Moreover, each of these switch circuits may be implemented with a crossbar switch, logically configured to include three sub-switches.

Frames from each of switch circuits 112-1 to 112-32 are supplied to a respective one of time division demultiplexers 810-10 to 810-32, which separate three sub-frames from each frame. The separated sub frames are supplied to a respective one of subswitches 701, 702 and 703 for appropriate routing therethrough. Outputs from each of subswitches 701 to 703 are coupled to a respective one of time division multiplexers 830-1 to 830-32. Time division multiplexer 830-1, for example, receives sub-frames from each of switches 701 to 703, and combines these sub-frames to output a frame to switch circuit 116-1. In a similar fashion, remaining time division multiplexers output frames to corresponding switch circuits 116-2 to 116-32 for further routing.

Switch circuits 116-1 to 116-32 are constructed in a similar fashion as switch circuits 112-1 to 112-32. Accordingly, these switches route data and are reconfigurable requisite hardware connections within each of switch circuits 112-1 to 112-32. in the manner described above with reference to FIGS. 4(a)–4(c), 5 and 6. Each of switch circuits 116-1 to 116-32 supplies signals to respective groupings of outputs. For example, switch circuit 116-1 supplies frames to outputs 118-1 to 118-8, while switch circuit 116-32 is coupled to outputs 118-249 to 118-256.

In general, outputs 118-1 to 118-256 take received data, reframe the data to its original format and protocol when it was input to switch 100, and convert the data to optical signals for further transmission. Typically, the output optical signals conform to the same SONET protocol as optical signals input to switch 100.

Figure 9:
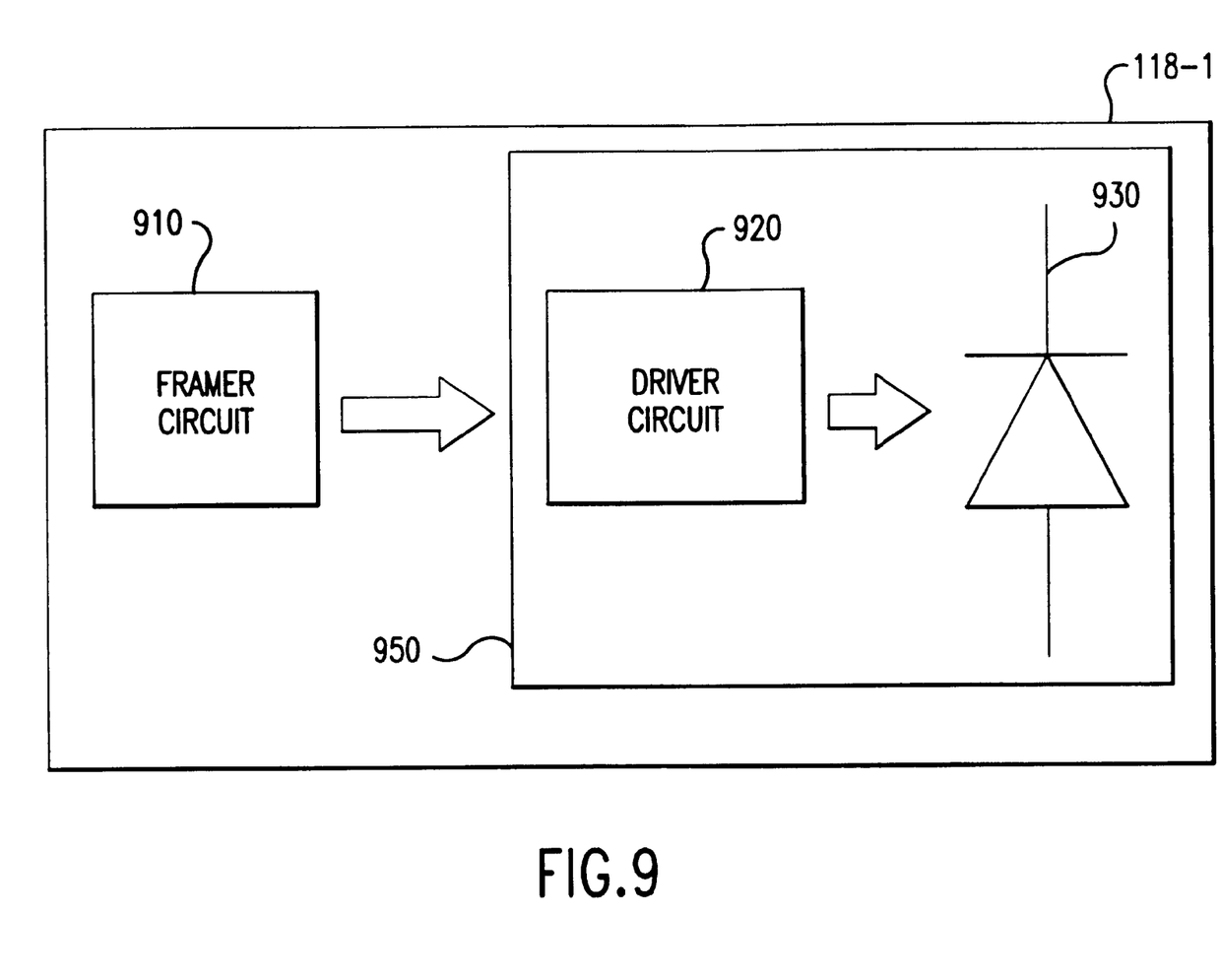
FIG. 9 illustrates one of the output blocks of the switch shown in FIG. 1.

FIG. 9 illustrates output 118-1 in greater detail. Output 118-1 includes framer circuit 910 coupled to receive data from an output port of switch 116-1. Framer circuit 910 reframes the received data into a format in which the data was input to switch 200. The data, in the form of electrical signals is next supplied to a transmitter circuit 950, including, for example driver circuit 920, which modulates laser diode 930 accordingly to output corresponding optical signals.

In summary, a switch having a non-power of 2 number of center stage switches can be reconfigured according to the Looping Algorithm by logically dividing each physical stage switch to obtain $2^n$ logical switches. Data is further time division multiplexed and routed based on the logical configuration of the physical center stage switches. As a result, a switch can be quickly reconfigured using the Looping Algorithm, even though it has fewer center stage physical switches, which consume less power and occupy less space.

Other embodiments will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A switch, comprising:

a first stage having a plurality of first switch circuits, each of said plurality of first switch circuits having a plurality of inputs and a plurality of outputs;

a second stage having a plurality of second switch circuits, each of said plurality of second switch circuits having a plurality of inputs, each of which being respectively coupled to one of said plurality of outputs of each of said plurality of first switch circuits, and a plurality of outputs, a number of said plurality of second switch circuits equaling N, where N is an integer other than a power of 2; and a third stage having a plurality of third switch circuits, each of said plurality of third switch circuits having a plurality of inputs and a plurality of outputs, each of said plurality of inputs of each of said plurality of third switch circuits being coupled to a respective one of said plurality of outputs of each of said plurality of second switch circuits, wherein each of said plurality of outputs of said plurality of first switch circuits, outputs of respective one of a plurality of data signals, said data signals being time-division multiplexed, wherein said each of said plurality of data signals includes a plurality of groups of time slots, each of said plurality of groups further including a plurality of subgroups of time slots, and wherein at least some of said plurality of second switch circuits are configured to be represented as n logical sub-switch circuits where n is a power of 2, each of said sub-switch circuits being configured to direct selected subgroups of time slots among different groups to one of said plurality of outputs of said plurality of second switch circuits.

2. A switch in accordance with claim 1, wherein a number of said plurality of logical sub-switch circuits in each of said plurality second switch circuits equals a number of said plurality of subgroups within each group of time slots.

3. A switch in accordance with claim 1, wherein each of said plurality of logical sub-switch circuits includes a demultiplexer coupled to selected ones of said plurality of inputs of said plurality of second switch circuits and a multiplexer coupled to selected ones of said plurality of outputs of said second switch circuits, said demultiplexer being configured to separate said plurality of subgroups from different first groups, and said multiplexer being configured to combine said selected ones of said subgroups in a predetermined manner to supply second groups of time slots.

4. A switch in accordance with claim 1, wherein said switch is a non-blocking switch.

5. A switch in accordance with claim 1, wherein said first, second and third pluralities of switch circuits are configured in accordance with a Looping Algorithm.

6. A switch in accordance with claim 1, wherein each of said pluralities of first and third switch circuits are configured to be logically represented as respective groupings of 2×2 switches.

7. A switch in accordance with claim 1, further comprising:
    a plurality of optical receiver circuits coupled to said plurality of inputs of said first switches; and
    a plurality of optical transmitter circuits coupled to said plurality of outputs of said third switches.

8. A switch in accordance with claim 1,
    wherein a number of said first switch circuits is 32 and said first switch circuits have a total of 256 inputs,
    wherein the number N of said second switch circuits is 22, and
    wherein a number of said third switch circuits is 32 and said third switch circuits have a total of 256 outputs.

9. A data transmission method, comprising:
    routing said data through a first switch stage, said first switch stage including a plurality of first switch circuits, said first switch circuits being configured to be logically represented as a first plurality of 2×2 switches;
    routing said data through a second switch stage, said second switch stage having N switch circuits, where N is other than a power of 2;
    routing said data through a third switch stage, said third switch stage including a plurality of third switch circuits, said third switch circuits being configured to be logically represented as a second plurality of 2×2 switches; and
    grouping said data into a plurality of frames, each of said frames including a plurality of subgroups, each of said subgroups including a plurality of time slots;
    said step of routing said data through said second stage of switches, including:
        demultiplexing a first frame into constituent first subgroups;
        demultiplexing a second frame into constituent second subgroups; and
        multiplexing at least one of said first subgroups and at least one of said
    second subgroups into a third frame;
    thereby configuring at least some of said second stage of switches to be represented as n logical switches, where n is a power of 2.

10. A method in accordance with claim 9, further comprising:
    reconfiguring said first, second and third switch circuits in accordance with a Looping Algorithm.

11. A method in accordance with claim 9, wherein said step of routing said data through said second switch stage further comprises the step of time-division multiplexing said data.

* * * * *